United States Patent
Taira et al.

(10) Patent No.: US 10,493,637 B2
(45) Date of Patent: Dec. 3, 2019

(54) SUCTION PAD AND METHOD OF SUCTION RELEASE OF SUCTION PAD

(71) Applicant: FANUC CORPORATION, Yamanashi (JP)

(72) Inventors: Yuuji Taira, Yamanashi-ken (JP); Hiroshi Oowatari, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/275,949

(22) Filed: Feb. 14, 2019

(65) Prior Publication Data
US 2019/0255714 A1    Aug. 22, 2019

(30) Foreign Application Priority Data

Feb. 20, 2018   (JP) .................. 2018-027804

(51) Int. Cl.
  B25J 15/06   (2006.01)
(52) U.S. Cl.
  CPC ....... B25J 15/0658 (2013.01); B25J 15/0616 (2013.01)
(58) Field of Classification Search
  CPC .. B25J 15/0616; B25J 15/0625; B25J 15/065; B25J 15/0658; B25J 15/0675; B65G 47/911; B66C 1/0256; H01L 21/6838; Y10S 901/40
  USPC ................ 294/183, 64.3, 186, 187
  See application file for complete search history.

(56) References Cited

U.S. PATENT DOCUMENTS

| | | | | |
|---|---|---|---|---|
| 3,743,340 A | * | 7/1973 | Williamann | B66C 1/0212 294/186 |
| 5,456,510 A | * | 10/1995 | Coots | H05K 13/0409 294/183 |
| 6,076,872 A | * | 6/2000 | Harter | B65G 47/917 294/186 |
| 7,374,217 B2 | * | 5/2008 | Pabst | B65G 47/91 251/339 |
| 7,597,370 B2 | * | 10/2009 | Tanae | B65G 47/91 294/64.3 |

(Continued)

FOREIGN PATENT DOCUMENTS

| JP | 2008-213051 A | 9/2008 |
|---|---|---|
| JP | 2010-253636 A | 11/2010 |

(Continued)

*Primary Examiner* — Dean J Kramer
(74) *Attorney, Agent, or Firm* — Robert P. Michal, Esq.; Carter, DeLuca & Farrell LLP (57) ABSTRACT

A suction pad includes: a pad main body which is hollow; an intake hole provided in the pad main body, the intake hole being for supplying a gas to an inside of the pad main body; a negative pressure generating hole provided in a bottom wall section on a side facing a suction object in the pad main body, the negative pressure generating hole being for generating a negative pressure between the bottom wall section and the suction object by jetting the gas flowing in from the intake hole; a negative pressure breaking hole provided in the bottom wall section, the negative pressure breaking hole being for breaking the negative pressure; a lid section that blocks the negative pressure breaking hole; and a drive section that, when releasing suction of the suction object, moves the lid section in such a manner that the negative pressure breaking hole opens.

8 Claims, 11 Drawing Sheets

(56) References Cited

U.S. PATENT DOCUMENTS

| | | | | |
|---|---|---|---|---|
| 8,714,609 B2* | 5/2014 | Sydorko | ............... | B25B 11/007 |
| | | | | 294/64.3 |
| 8,864,200 B2* | 10/2014 | Lomerson, Jr. | ...... | B25J 15/0633 |
| | | | | 294/186 |
| 9,764,479 B2* | 9/2017 | Cho | ......................... | F04F 5/20 |

FOREIGN PATENT DOCUMENTS

| JP | 2013-234009 A | 11/2013 |
|---|---|---|
| JP | 2016-068164 A | 5/2016 |

\* cited by examiner

FIG. 11

SUCTION PAD AND METHOD OF SUCTION RELEASE OF SUCTION PAD

CROSS-REFERENCE TO RELATED APPLICATION

This application is based upon and claims the benefit of priority from Japanese Patent Application No. 2018-027804 filed on Feb. 20, 2018, the contents of which are incorporated herein by reference.

BACKGROUND OF THE INVENTION

Field of the Invention

The present invention relates to a suction pad that suctions a suction object by a negative pressure and releases suction of the suction pad by breaking that negative pressure, and to a method of suction release of the suction pad.

Description of the Related Art

Japanese Laid-Open Patent Publication No. 2013-234009 discloses a suction pad that includes a ring-shaped Bernoulli jetting section in a lower section of the suction pad, and suctions a plate-like suction object by forming a negative pressure on an inner side of the Bernoulli jetting section, and forming a positive pressure in a periphery of that negative pressure to make a gap between the suction object and the lower section of the suction pad.

SUMMARY OF THE INVENTION

Incidentally, when releasing suction of the suction object, the heavier the suction object is, the easier it is for the suction object to promptly separate from the suction pad by its own weight, in a period from when the negative pressure formed between the suction object and the lower section of the suction pad is broken until the negative pressure returns to atmospheric pressure. In contrast, there is a tendency that the lighter the suction object is, the longer will be a time until the suction object separates from the suction pad. Therefore, it is demanded that suction of the suction object is quickly released.

Accordingly, the present invention has an object of providing a suction pad and a method of suction release of the suction pad by which suction of the suction object can be quickly released.

A first aspect of the present invention is a suction pad including: a pad main body which is hollow; an intake hole provided in the pad main body, the intake hole being for supplying a gas to an inside of the pad main body; a negative pressure generating hole provided in a bottom wall section on a side facing a suction object in the pad main body, the negative pressure generating hole being for generating a negative pressure between the bottom wall section and the suction object by jetting the gas flowing in from the intake hole; a negative pressure breaking hole provided in the bottom wall section, the negative pressure breaking hole being for breaking the negative pressure; a lid section that blocks the negative pressure breaking hole; and a drive section that, when releasing suction of the suction object, moves the lid section in such a manner that the negative pressure breaking hole opens.

A second aspect of the present invention is a method of suction release of a suction pad for releasing suction of a suction object, the suction pad including: a pad main body which is hollow; an intake hole provided in the pad main body, the intake hole being for supplying a gas to an inside of the pad main body; a negative pressure generating hole provided in a bottom wall section on a side facing the suction object in the pad main body, the negative pressure generating hole being for generating a negative pressure between the bottom wall section and the suction object by jetting the gas flowing in from the intake hole; a negative pressure breaking hole provided in the bottom wall section, the negative pressure breaking hole being for breaking the negative pressure; and a lid section that blocks the negative pressure breaking hole, the method including when releasing suction of the suction object, moving the lid section in such a manner that the negative pressure breaking hole opens.

In the above-described first and second aspects, when the negative pressure breaking hole opens, air on the inside of the pad main body flows to outside from the negative pressure breaking hole, whereby the negative pressure that had been generated between the bottom wall section of the pad main body and the suction object is broken. Therefore, suction of the suction object can be released more quickly compared to when jetting of the gas from the negative pressure generating hole is simply just stopped.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a suction pad according to the present invention will be presented and described in detail below with reference to the accompanying drawings.

Embodiment

Figure 1:
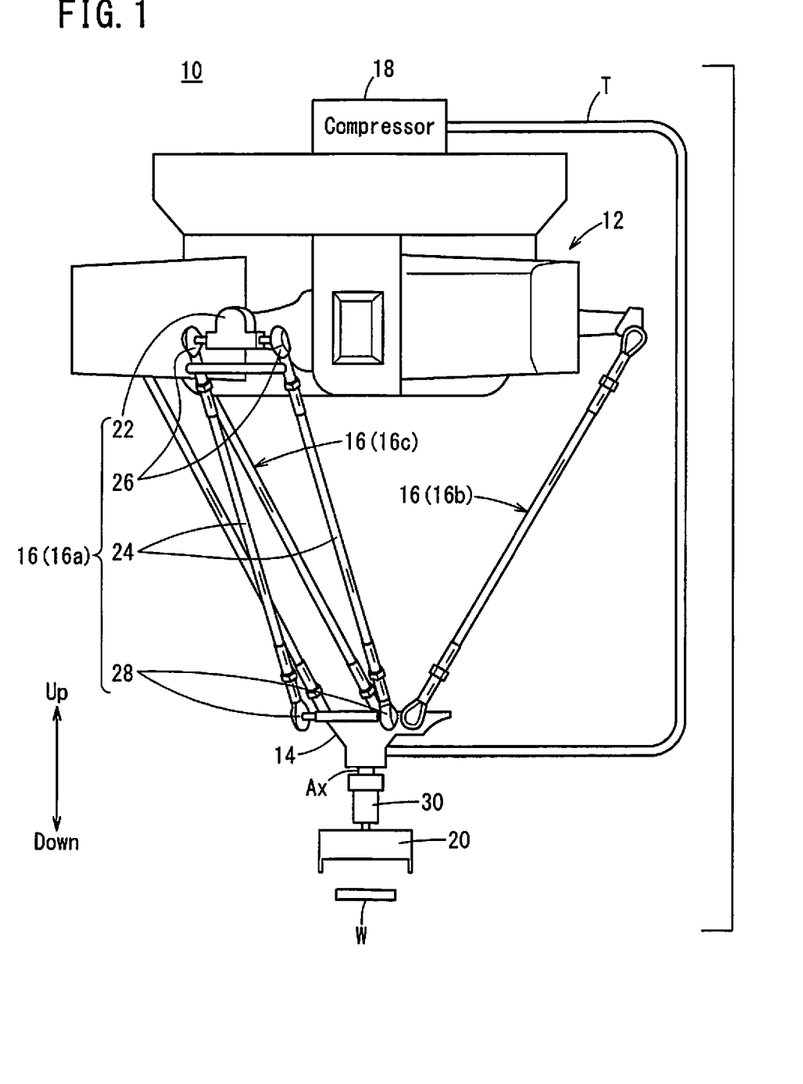
FIG. 1 is a view showing a schematic configuration of a parallel link robot.

FIG. 1 is a view showing a schematic configuration of a parallel link robot 10. The parallel link robot 10 includes: a base section 12; a movable section 14 disposed separated from the base section 12; and a plurality of link sections 16 that couple the base section 12 and the movable section 14. Note that in the present embodiment, the movable section 14 is assumed to be separated in a downward direction from the base section 12. The downward direction is a direction that gravity acts.

Each of the plurality of link sections 16 has a structure having one degree of freedom with respect to the base section 12. In the present embodiment, the plurality of link sections 16 are assumed to be three link sections, namely, a first link section 16*a*, a second link section 16*b*, and a third link section 16*c*. The first link section 16*a*, the second link section 16*b*, and the third link section 16*c* have structures that are similar to each other, hence descriptions of the second link section 16*b* and the third link section 16*c* will be omitted.

The first link section 16*a* includes: a drive link 22; and a pair of passive links 24 that extend in an up-down direction in a state of being parallel to each other. The drive link 22 extends outwardly from the base section 12, and is connected to an unillustrated actuator. Note that the actuator is provided in the base section 12.

An end section on an upper side of each of the passive links 24 is coupled to the drive link 22 by a ball joint 26, and an end section on a lower side of each of the passive links 24 is coupled to the movable section 14 by a different ball joint 28.

In addition, the parallel link robot 10 includes a compressor 18 and a suction pad 20. The compressor 18 compresses a gas, and sends out the compressed gas. This compressor 18 is provided in the base section 12, and the compressor 18 and the suction pad 20 are connected by a tube T, for example. The gas sent out by the compressor 18 is supplied to the suction pad 20 via the tube T.

The suction pad 20 suctions a suction object W by a negative pressure, and releases suction of the suction object W by breaking that negative pressure. The likes of a rice cracker or tempura, for example, may be cited as the suction object W.

This suction pad 20 is attached, via a coupling unit 30, to a bottom region of the movable section 14, in such a manner that the suction pad 20 can be replaced. The bottom region of the movable section 14 is a region on an opposite side to a base section 12 side in the movable section 14.

The coupling unit 30 is a unit coupling the movable section 14 and the suction pad 20, and is attached to a rotating shaft Ax that extends from the bottom region of the movable section 14. This coupling unit 30 can be removed from the rotating shaft Ax of the movable section 14. Note that the coupling unit 30 need not be included. When the coupling unit 30 is not included, the suction pad 20 is attached by being fixed to the rotating shaft Ax of the movable section 14.

The parallel link robot 10 individually controls the actuators connected to the drive links 22 in the first through third link sections 16*a*-16*c*, whereby the movable section 14 coupled to said first through third link sections 16*a*-16*c* is disposed in a desired position with three degrees of freedom.

In the case of suctioning the suction object W, the parallel link robot 10 drives the compressor 18 to supply the gas to the suction pad 20. In this case, the suction pad 20 generates a negative pressure between itself and the suction object W by jetting the gas supplied from the compressor 18. As a result, the suction object W is suctioned onto the suction pad 20.

On the other hand, in the case of releasing suction of the suction object W, the suction pad 20 breaks the negative pressure occurring between itself and the suction object W. As a result, suction of the suction object W is released, and the suction object W separates from the suction pad 20. Note that when the negative pressure is broken, the gas may or may not be supplied to the suction pad 20 from the compressor 18.

Figure 2:
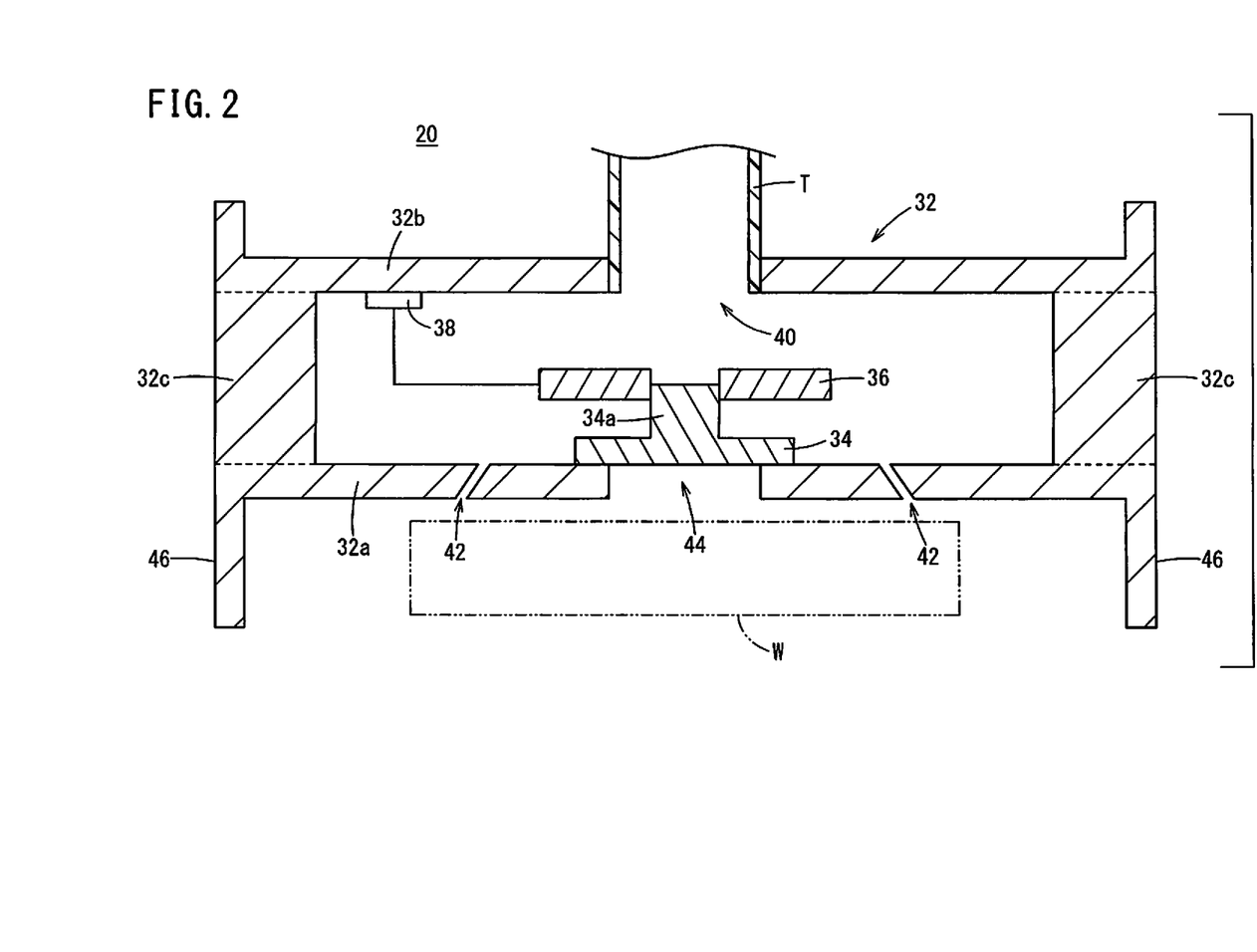
FIG. 2 is a cross-sectional view showing a suction pad of FIG. 1.
Figure 3:
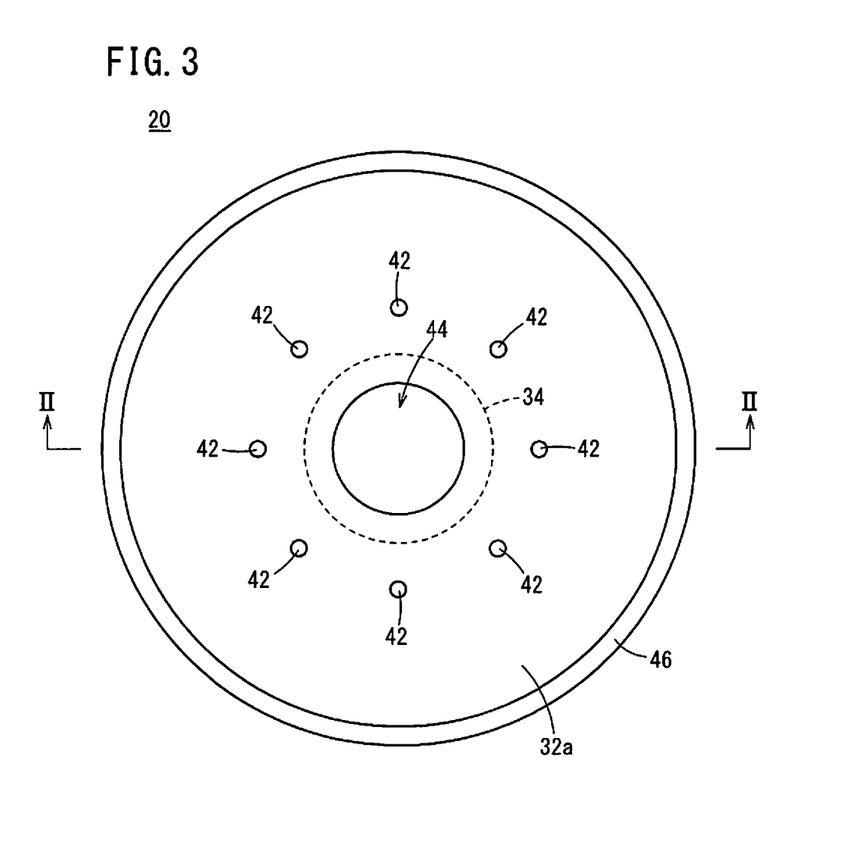
FIG. 3 is a view in which a bottom surface side of the suction pad of FIG. 1 is seen in front view.

FIG. 2 is a cross-sectional view showing the suction pad 20. FIG. 3 is a view in which a bottom surface side of the suction pad 20 is seen in front view. Note that FIG. 2 shows a cross section taken along the line II-II of FIG. 3. The suction pad 20 includes a pad main body 32, a lid section 34, a drive section 36, and a drive control section 38.

The pad main body 32 is a hollow box body. In the present embodiment, a shape of the pad main body 32 is assumed to be a hollow circular column shape. This pad main body 32 is provided with an intake hole 40, a negative pressure generating hole 42, a negative pressure breaking hole 44, and a frame section 46.

The intake hole 40 is a hole for supplying the gas to an inside of the pad main body 32, and is provided in a top wall section 32*b* on an opposite side to a bottom wall section 32*a* of the pad main body 32. The bottom wall section 32*a* of the pad main body 32 is a wall section on a side facing the suction object W in the pad main body 32.

The tube T (FIG. 1) whose one end side is connected to the compressor 18 (FIG. 1) has its other end side connected to the intake hole 40. The gas supplied via the tube T (FIG. 1) from the compressor 18 (FIG. 1) flows into the inside of the pad main body 32 from the intake hole 40.

The negative pressure generating hole 42 is a hole for generating a negative pressure between the bottom wall section 32*a* and the suction object W by jetting the gas flowing in from the intake hole 40, and is provided in the bottom wall section 32*a*. A plurality of the negative pressure generating holes 42 of the present embodiment are provided around the negative pressure breaking hole 44.

The plurality of negative pressure generating holes 42 are disposed around the negative pressure breaking hole 44 at intervals of same degree. The negative pressure generating holes 42 are each largely of the same shape and same size as each other, and are each inclined in such a manner that the further an outside of the pad main body 32 is approached from the inside of the pad main body 32, the closer the negative pressure generating holes 42 come to a circumferential edge side of the bottom wall section 32*a*. In other words, the negative pressure generating holes 42 are each inclined in such a manner that the more a downward direction is followed, the more the negative pressure generating holes 42 extend to the circumferential edge side of the bottom wall section 32*a*. Therefore, it is difficult for a turbulent flow to occur in the gas jetting from the negative pressure generating hole 42, and it is easy for a negative pressure effect to increase. As a result, the suction object W can be stably held.

Note that although the intake hole 40 is disposed in the top wall section 32*b* on the opposite side to the bottom wall section 32*a* where the negative pressure generating hole 42 is provided, the intake hole 40 may be provided in the bottom wall section 32*a* or a side wall section 32*c*. However, in order to make it easy for the gas flowing into the inside of the pad main body 32 to be guided to the negative pressure generating hole 42, the intake hole 40 is preferably provided in the top wall section 32*b*.

The negative pressure breaking hole 44 is a hole for breaking the negative pressure, and is provided in the bottom wall section 32a. The negative pressure breaking hole 44 of the present embodiment is disposed in a center of the bottom wall section 32a, and a minimum cross-sectional area in the negative pressure breaking hole 44 is larger than a cross-sectional area of the negative pressure generating hole 42.

The minimum cross-sectional area in the negative pressure breaking hole 44 is a cross-sectional area of a narrowest portion within the negative pressure breaking hole 44. Note that if the negative pressure breaking hole 44 is a circular column shaped hole, for example, then the negative pressure breaking hole 44 has a single unchanging cross-sectional area, and that single cross-sectional area is the minimum cross-sectional area. Moreover, when the number of negative pressure generating holes 42 is a plurality as in the case of the negative pressure generating hole 42 of the present embodiment, the minimum cross-sectional area in the negative pressure breaking hole 44 is made larger than a total value of the cross-sectional areas of each of the negative pressure generating holes 42.

The frame section 46 suppresses that the suction object w in a suctioned state slides in a direction along the bottom wall section 32a, and the frame section 46 extends in a largely straight manner along a downward direction from the circumferential edge of the bottom wall section 32a. Note that the frame section 46 need not be included.

The lid section 34 blocks the negative pressure breaking hole 44. The lid section 34 of the present embodiment is made of a metal, is disposed on the inside of the pad main body 32, and presses in a downward direction against the bottom wall section 32a by its own weight, thereby blocking the negative pressure breaking hole 44. Moreover, the lid section 34 of the present embodiment includes a projection 34a that extends upwardly in a largely straight manner.

The drive section 36, when releasing suction of the suction object W, moves the lid section 34 in such a manner that the negative pressure breaking hole 44 opens. The drive section 36 of the present embodiment is an electromagnet, and is electrified to generate a magnetic force when releasing suction of the suction object W. Thereby, the drive section 36 moves the lid section 34 along a direction of separating from the bottom wall section 32a (an upward direction). As a result, the negative pressure breaking hole 44 that had been blocked by the lid section 34 opens.

Note that in the case of re-blocking the negative pressure breaking hole 44 which is in an opened state, electrification is cut off in the drive section 36 (electromagnet). Thereby, the magnetic force of the drive section 36 (electromagnet) disappears, and the lid section 34 moves along a direction of approaching the bottom wall section 32a (a downward direction) by its own weight. As a result, the negative pressure breaking hole 44 is blocked by the lid section 34. Note that the drive section 36 (electromagnet) of the present embodiment is ring-shaped, and by having the projection 34a of the lid section 34 inserted within its ring, supports the lid section 34.

The drive control section 38 controls the drive section 36. The drive control section 38 of the present embodiment, when releasing suction of the suction object W, is given a drive instruction from the parallel link robot 10 (FIG. 1). Upon receiving this drive instruction, the drive control section 38 electrifies the drive section 36 (electromagnet).

Note that apart from when releasing suction of the suction object W, the drive control section 38 is not given the drive instruction from the parallel link robot 10 (FIG. 1). Therefore, the drive control section 38 does not electrify the drive section 36 (electromagnet) apart from when releasing suction of the suction object W.

Figure 4:
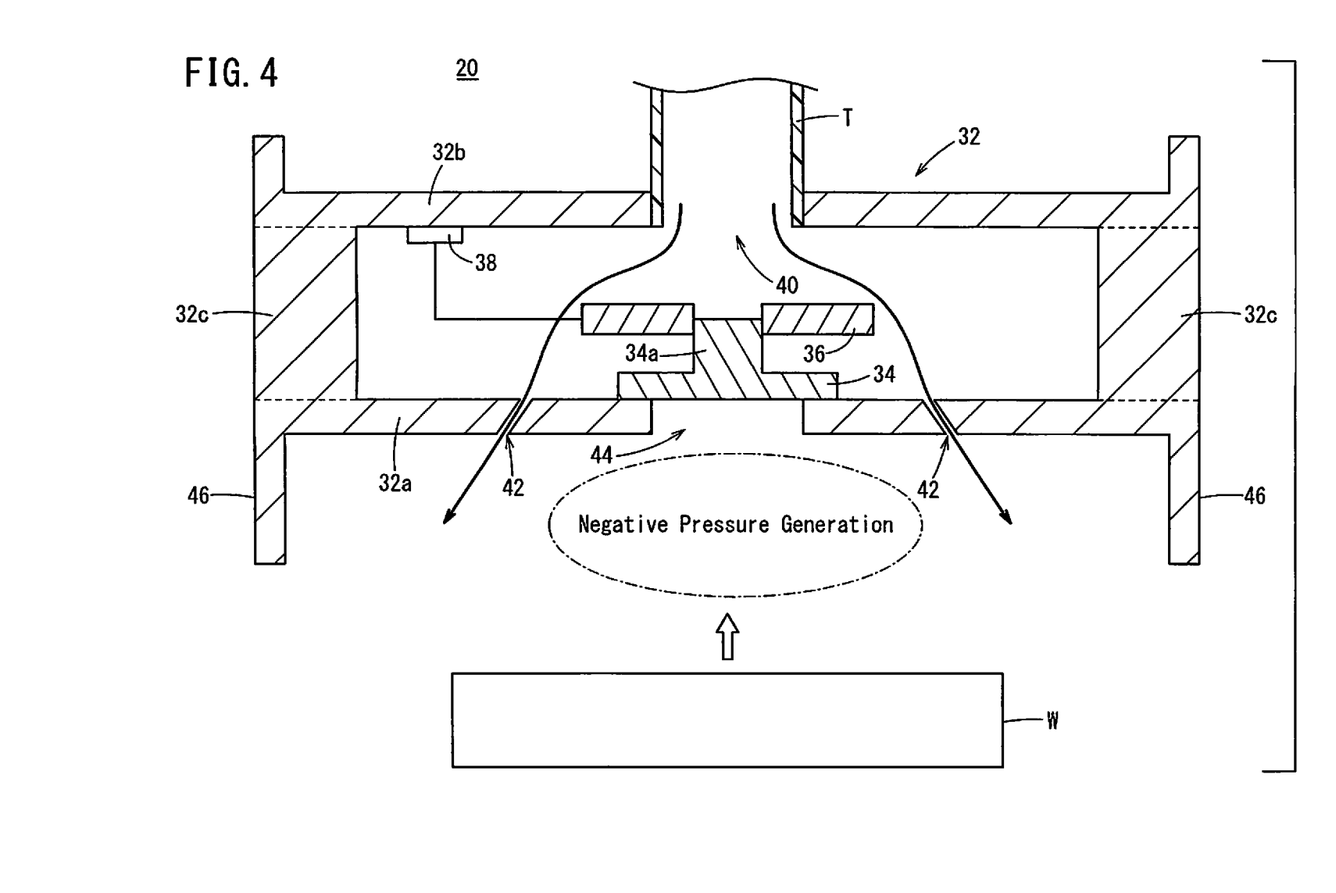
FIG. 4 is a cross-sectional view showing a state of negative pressure generation of the suction pad of FIG. 1.

Next, operation of the suction pad 20 to suction the suction object W will be described. FIG. 4 is a cross-sectional view showing a state of negative pressure generation of the suction pad 20. When suctioning the suction object W, the gas flows from the compressor 18 (FIG. 1) into the inside of the pad main body 32 in the suction pad 20, via the tube T (FIG. 1). The suction pad 20 jets from the negative pressure generating holes 42 the gas that has flowed into the inside of the pad main body 32.

When the gas is jetted from the negative pressure generating holes 42, that jetted gas is released into the air from a gap between the bottom wall section 32a and the suction object W. At this time, the air between the bottom wall section 32a and the suction object W is pulled in an outer peripheral direction, whereby a negative pressure is generated in a lower section of the negative pressure breaking hole 44. Due to this negative pressure, the suction object W is suctioned and held in a state of non-contact with the bottom wall section 32a. Note that the suction object W and the bottom wall section 32a may be in contact.

In this way, the suction pad 20 suctions the suction object W by the negative pressure generated by jetting from the negative pressure generating holes 42 the gas that has flowed into the inside of the pad main body 32.

Note that when suctioning the suction object W, the drive control section 38 is not given the drive instruction from the parallel link robot 10 (FIG. 1), hence the drive section 36 (electromagnet) is never electrified by the drive control section 38. Therefore, when suctioning the suction object W, the lid section 34 of the suction pad 20 presses in a downward direction against the bottom wall section 32a by its own weight, thereby blocking the negative pressure breaking hole 44. As a result, there is no effect on the negative pressure being generated in the lower section of the negative pressure breaking hole 44.

Figure 5:
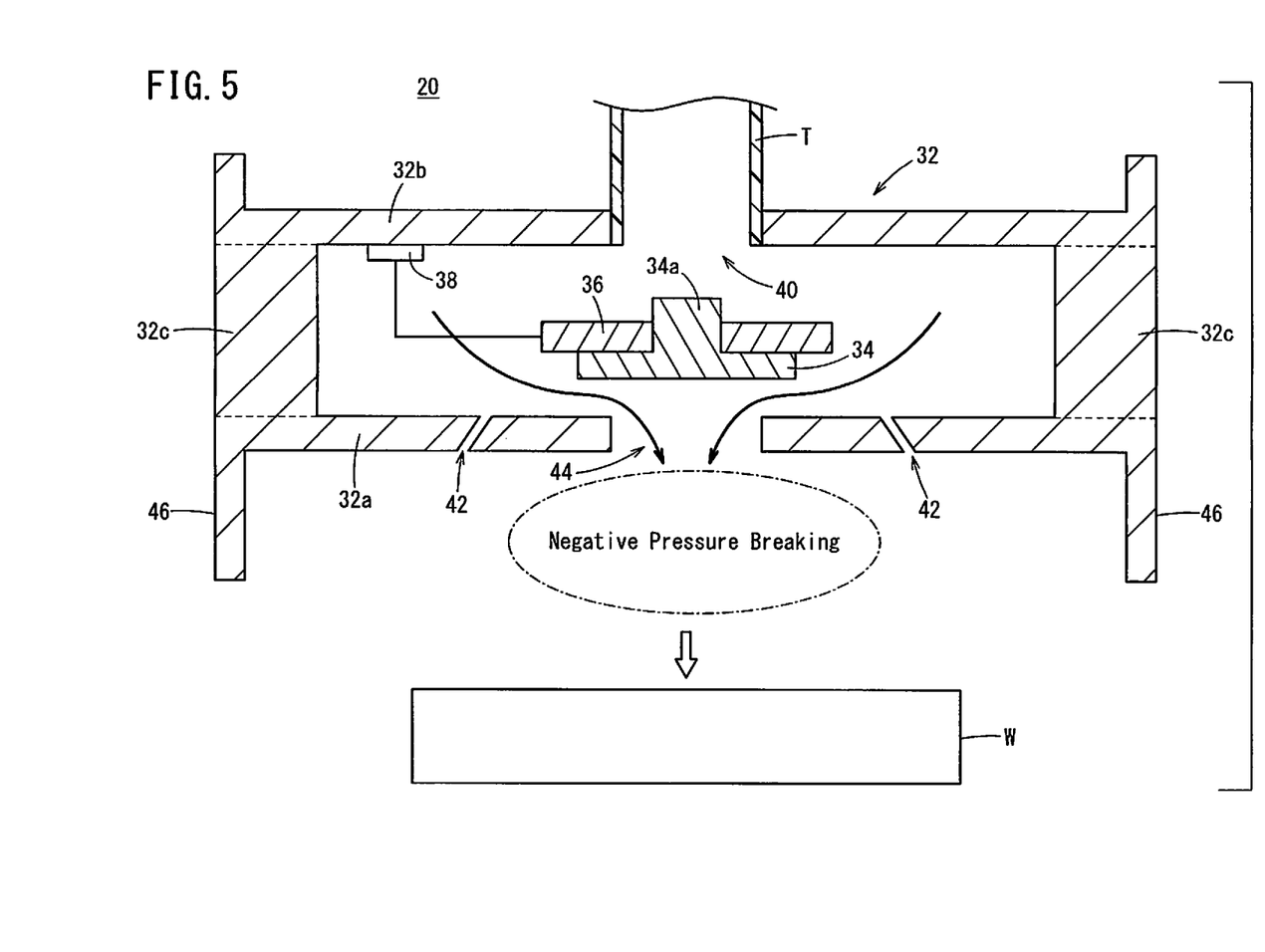
FIG. 5 is a cross-sectional view showing a state of negative pressure breaking of the suction pad of FIG. 1.

Next, operation of the suction pad 20 to release suction of the suction object W will be described. FIG. 5 is a cross-sectional view showing a state of negative pressure breaking of the suction pad 20. When suction of the suction object W is released, the drive control section 38 is given the drive instruction from the parallel link robot 10 (FIG. 1). By being given this drive instruction, the drive control section 38 electrifies the drive section 36 (electromagnet).

Upon the drive section 36 (electromagnet) being electrified, the drive section 36 (electromagnet) generates a magnetic force, whereby the lid section 34 moves to the drive section 36 (electromagnet) along the direction of separating from the bottom wall section 32a (the upward direction). As a result, the negative pressure breaking hole 44 opens. As described above, the minimum cross-sectional area in this negative pressure breaking hole 44 is larger than the cross-sectional area of the negative pressure generating holes 42. Therefore, when the negative pressure breaking hole 44 opens, the air on the inside of the pad main body 32 flows to outside from the negative pressure breaking hole 44. As a result, the negative pressure that had been generated in the lower section of the negative pressure breaking hole 44 is broken.

By thus opening the negative pressure breaking hole 44 when releasing suction of the suction object W, the suction pad 20 can release suction of the suction object W more quickly compared to when jetting of the gas from the negative pressure generating holes 42 is simply just stopped.

MODIFIED EXAMPLES

That concludes description of the above-described embodiment as one example of the present invention. However, the technical scope of the present invention is not limited to the scope described in the above-described embodiment. It is of course possible for various alterations or improvements to be applied to the above-described embodiment. It is clear from the descriptions of the claims that the forms supplemented by such alterations or improvements may also be included in the technical scope of the present invention.

Note that some of the forms supplemented by the alterations or improvements will be described below as modified examples. However, configurations that are equivalent to the configurations that have been described in the above-described embodiment will be assigned with the same symbols as those assigned in the above-described embodiment, and duplicated descriptions thereof will be omitted.

Modified Example 1

Figure 6:
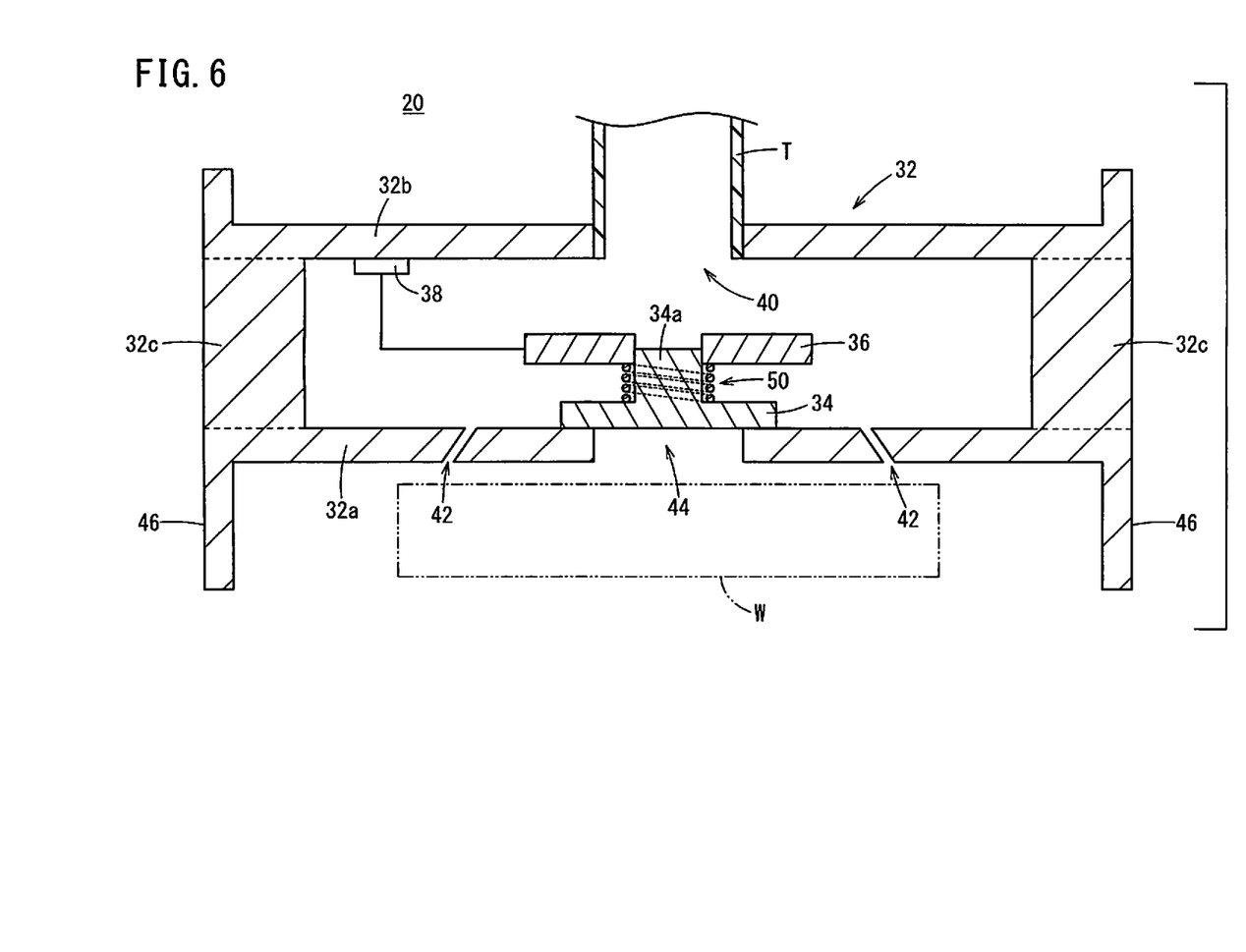
FIG. 6 is a cross-sectional view showing a suction pad of modified example 1.

FIG. 6 is a cross-sectional view showing a suction pad 20 of modified example 1. The suction pad 20 of modified example 1 differs from the suction pad 20 of the above-described embodiment in newly including a biasing section 50 that biases the lid section 34 so as to press against the bottom wall section 32a.

In the example shown in FIG. 6, the biasing section 50 is a single spring wound around the projection 34a of the lid section 34. Note that the biasing section 50 may be a plurality of springs disposed at intervals around the projection 34a of the lid section 34, or may be tubular rubber disposed around the projection 34a, for example.

By thus including the biasing section 50 that biases the lid section 34 so as to press against the bottom wall section 32a, the negative pressure breaking hole 44 can be stably blocked, even when the lid section 34 is lightweight.

Modified Example 2

Figure 7:
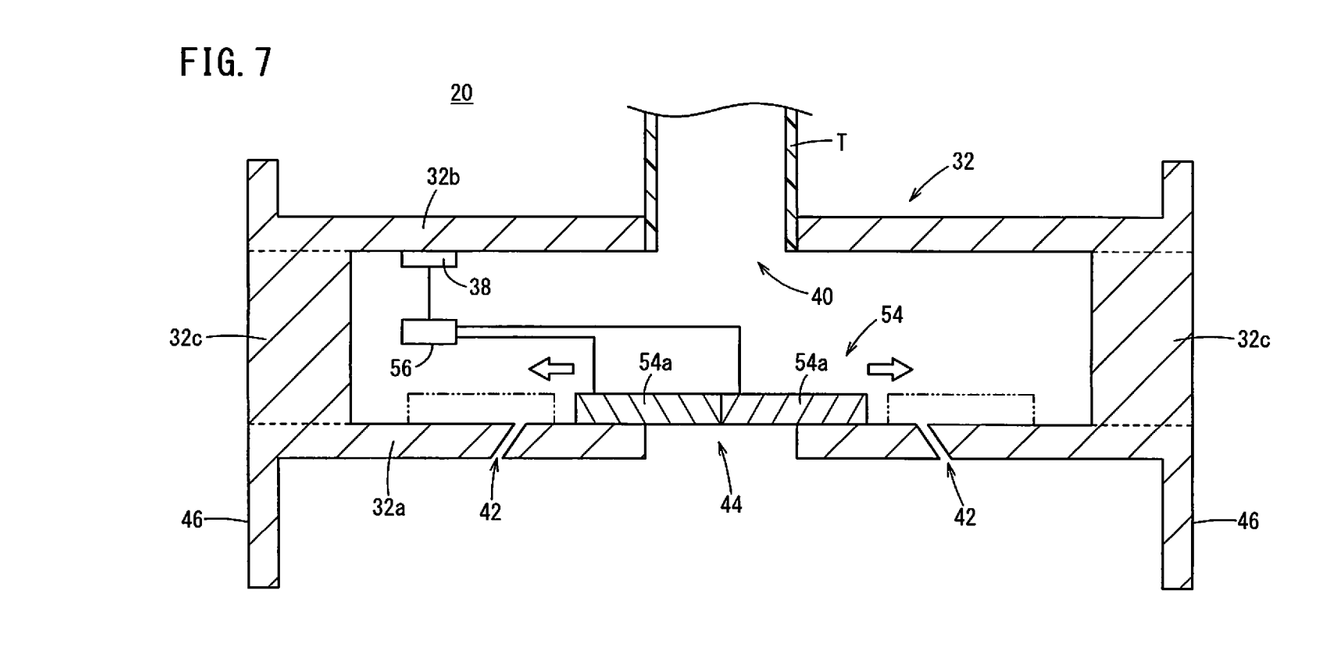
FIG. 7 is a cross-sectional view showing a suction pad of modified example 2.
Figure 8:
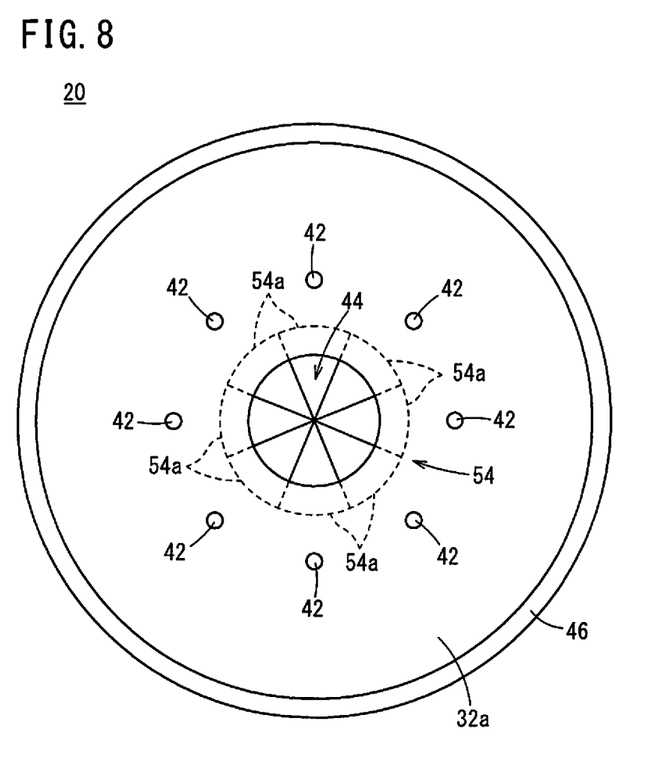
FIG. 8 is a view in which a bottom surface side of the suction pad of modified example 2 is seen in front view.

FIG. 7 is a cross-sectional view showing a suction pad 20 of modified example 2, and FIG. 8 is a view in which a bottom surface side of the suction pad 20 of modified example 2 is seen in front view. The suction pad 20 of modified example 2 differs from the suction pad 20 of the above-described embodiment in including a lid section 54 instead of the lid section 34 of the above-described embodiment, and in including a drive section 56 instead of the drive section 36 of the above-described embodiment.

The lid section 54 includes a plurality of movable pieces 54a. The plurality of movable pieces 54a are capable of moving divided, and when suctioning the suction object W, congregate without any gaps between each other, thereby blocking the negative pressure breaking hole 44. In the example shown in FIGS. 7 and 8, the number of movable pieces 54a is the same as the number of negative pressure generating holes 42, and the plurality of movable pieces 54a and plurality of negative pressure generating holes 42 correspond in a one-to-one manner.

Figure 9:
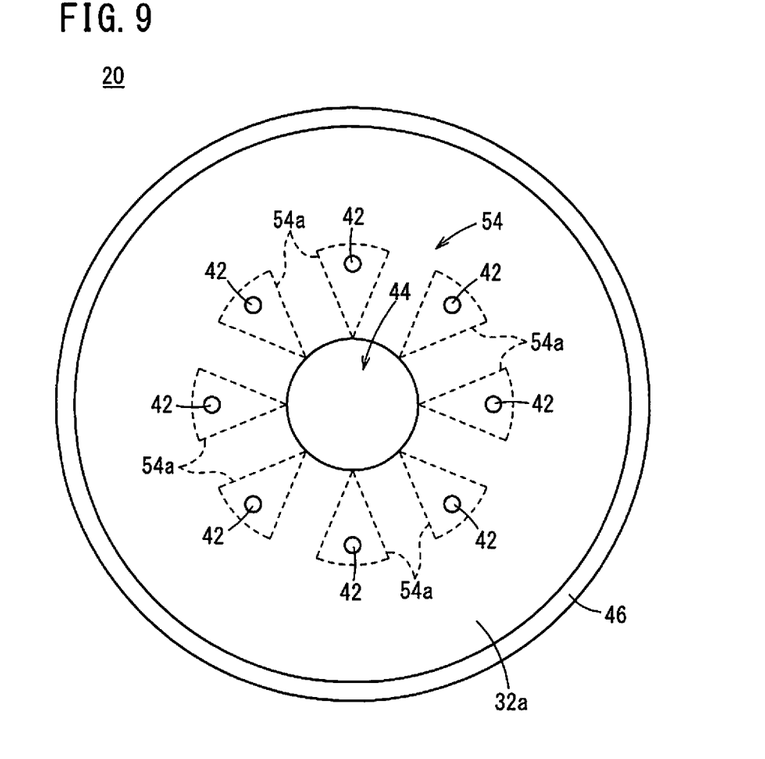
FIG. 9 is a view in which a state of movable pieces when releasing a negative pressure, is shown from the same viewpoint as in FIG. 8.

The drive section 56 moves the plurality of movable pieces 54a in such a manner that the plurality of movable pieces 54a are divided from each other, whereby the negative pressure breaking hole 44 opens. FIG. 9 is a view in which a state of the movable pieces 54a when releasing the negative pressure, is shown from the same viewpoint as in FIG. 8.

In the example shown in FIG. 9, the drive section 56, upon receiving the drive instruction from the drive control section 38, moves each of the movable pieces 54a to a certain position along the bottom wall section 32a so that the movable pieces 54a separate from the negative pressure breaking hole 44, and thereby divides the plurality of movable pieces 54a from each other. As a result, the negative pressure breaking hole 44 opens.

Now, each of the movable pieces 54a that has been moved to the certain position blocks its corresponding negative pressure generating hole 42, whereby all of the plurality of negative pressure generating holes 42 are blocked. As a result, even if the minimum cross-sectional area in the negative pressure breaking hole 44 is smaller than the cross-sectional area of the negative pressure generating holes 42, the air on the inside of the pad main body 32 flows to outside from the negative pressure breaking hole 44, hence the negative pressure in the lower section of the negative pressure breaking hole 44 can be broken.

Note that when the minimum cross-sectional area in the negative pressure breaking hole 44 is larger than the cross-sectional area of the negative pressure generating holes 42, the negative pressure in the lower section of the negative pressure breaking hole 44 can be broken more quickly compared to in the above-described embodiment.

When re-blocking the negative pressure breaking hole 44 which is in the opened state, the drive section 56 moves each of the movable pieces 54a along the bottom wall section 32a so that the movable pieces 54a approach the negative pressure breaking hole 44, and thereby congregates the plurality of movable pieces 54a without any gaps between each other. As a result, the negative pressure breaking hole 44 is blocked.

Note that although in modified example 2, the plurality of movable pieces 54a and plurality of negative pressure generating holes 42 have corresponded in a one-to-one manner, the plurality of movable pieces 54a and plurality of negative pressure generating holes 42 need not correspond in a one-to-one manner. Specifically, although the plurality of movable pieces 54a that have been moved to the certain position block all of the negative pressure generating holes 42, there may be a negative pressure generating hole 42 not blocked by a movable piece 54a. Moreover, although some of the plurality of movable pieces 54a that have been moved to the certain position block all of the plurality of negative pressure generating holes 42, there may be a movable piece 54a not blocking a negative pressure generating hole 42. Moreover, some of the plurality of movable pieces 54a that have been moved to the certain position may block some of the plurality of negative pressure generating holes 42.

Modified Example 3

Figure 10:
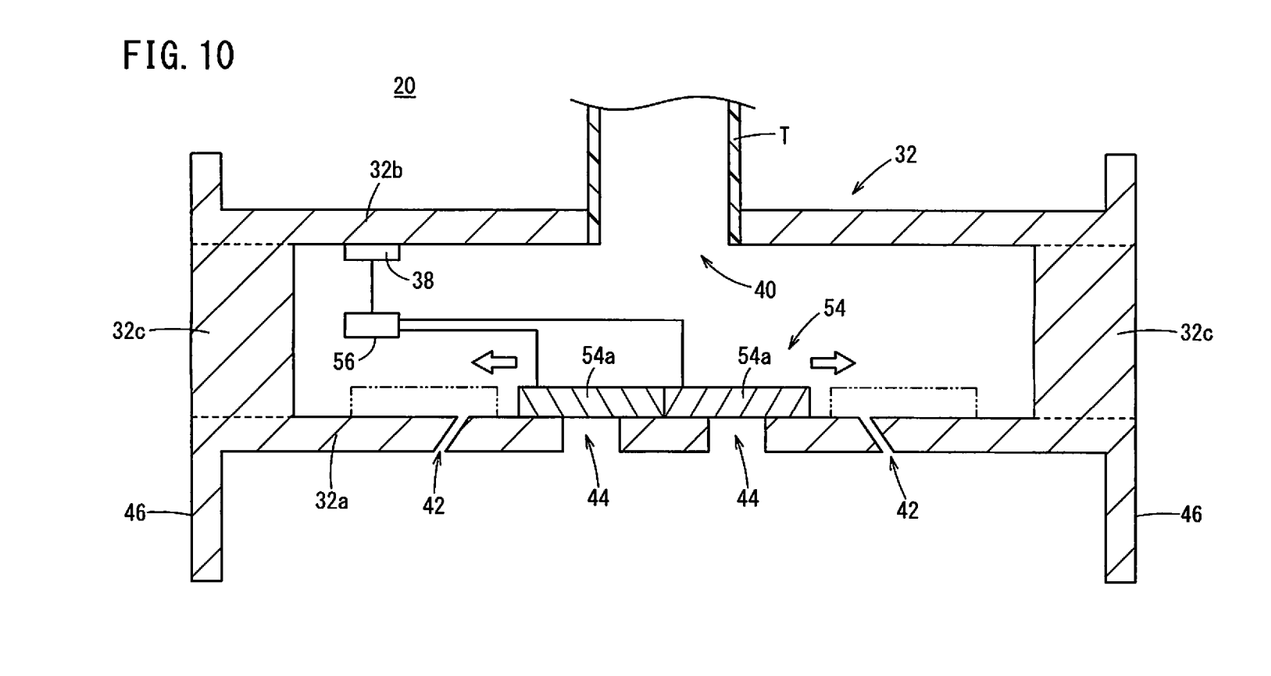
FIG. 10 is a cross-sectional view showing a suction pad of modified example 3.

FIG. 10 is a cross-sectional view showing a suction pad 20 of modified example 3. The suction pad 20 of modified example 3 differs from the suction pad 20 of above-described modified example 2 in including a plurality of the negative pressure breaking holes 44. When there are a plurality of the negative pressure breaking holes 44, the minimum cross-sectional area in the negative pressure breaking hole 44 is a total value of the minimum cross-sectional areas of each of the negative pressure breaking holes 44. Similar advantages to those of above-described modified example 2 are obtained, even when there are a plurality of the negative pressure breaking holes 44 in this way.

Note that there may be a plurality of the negative pressure breaking holes 44 of the above-described embodiment. Similar advantages to those of the above-described embodiment are obtained, even when there are configured to be a plurality of the negative pressure breaking holes 44 of the above-described embodiment.

Modified Example 4

Figure 11:
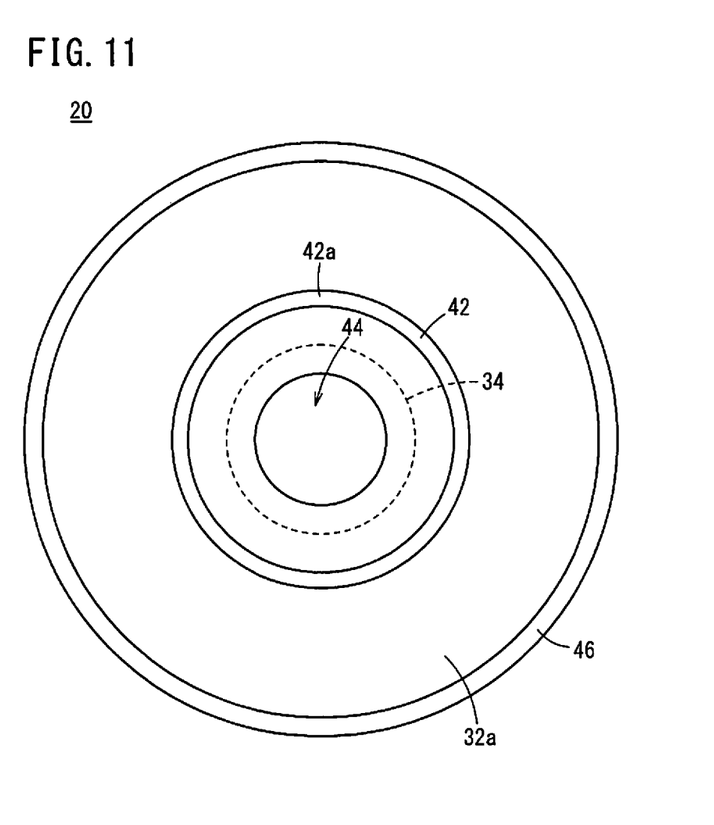
FIG. 11 is a view in which a bottom surface side of a suction pad of modified example 4 is seen in front view.

FIG. 11 is a view in which a bottom surface side of a suction pad 20 of modified example 4 is seen in front view. The suction pad 20 of modified example 4 differs from the suction pad 20 of the above-described embodiment in including a ring-shaped negative pressure generating hole 42a. The negative pressure can be generated similarly to in the above-described embodiment, even when there is such a ring-shaped negative pressure generating hole 42a. Note that the ring-shaped negative pressure generating hole 42a, provided it extends in a ring-like shape, includes also the cases of being discontinuous at one place or intermittently.

Note that the ring-shaped negative pressure generating hole 42a may be applied instead of the plurality of negative pressure generating holes 42 of modified example 2. In this case, each of the movable pieces 54a that have been moved to the certain position may block a part of the ring-shaped negative pressure generating hole 42a.

Modified Example 5

Although the lid section 34, the drive section 36, and the drive control section 38 of the above-described embodiment have been provided on the inside of the pad main body 32, they may be provided on the outside of the pad main body 32. Moreover, although the lid section 54 and the drive section 56 of above-described modified example 2 have been provided on the inside of the pad main body 32, they may be provided on the outside of the pad main body 32.

Modified Example 6

The above-described embodiment and above-described modified examples 1-5 may be arbitrarily combined in a range not causing inconsistency.

TECHNICAL IDEAS

Technical ideas understandable from the above-described embodiment and modified examples will be described below.

A suction pad (20) includes: a pad main body (32) which is hollow; an intake hole (40) provided in the pad main body (32), the intake hole (40) being for supplying a gas to an inside of the pad main body (32); a negative pressure generating hole (42, 42a) provided in a bottom wall section (32a) on a side facing a suction object (W) in the pad main body (32), the negative pressure generating hole (42, 42a) being for generating a negative pressure between the bottom wall section (32a) and the suction object (W) by jetting the gas flowing in from the intake hole (40); a negative pressure breaking hole (44) provided in the bottom wall section (32a), the negative pressure breaking hole (44) being for breaking the negative pressure; a lid section (34, 54) that blocks the negative pressure breaking hole (44); and a drive section (36, 56) that, when releasing suction of the suction object (W), moves the lid section (34, 54) in such a manner that the negative pressure breaking hole (44) opens.

In this suction pad (20), when the negative pressure breaking hole (44) opens, air on the inside of the pad main body (32) flows to outside from the negative pressure breaking hole (44), whereby the negative pressure that had been generated between the bottom wall section (32a) of the pad main body (32) and the suction object (W) is broken. Therefore, suction of the suction object (W) can be released more quickly compared to when jetting of the gas from the negative pressure generating hole (42, 42a) is simply just stopped.

A configuration may be adopted whereby a minimum cross-sectional area in the negative pressure breaking hole (44) is made larger than a cross-sectional area of the negative pressure generating hole (42, 42a). Configuring in this way makes it possible for the air on the inside of the pad main body (32) to be passed to outside from the negative pressure breaking hole (44) by opening the negative pressure breaking hole (44), without blocking the negative pressure generating hole (42, 42a), when releasing suction of the suction object (W).

A configuration may be adopted whereby the drive section (36) moves the lid section (34) along a direction of separating from the bottom wall section (32a). Configuring in this way makes it easy for a width of the suction pad (20) to be narrowed.

A configuration may be adopted whereby the drive section (56) moves the lid section (54) along the bottom wall section (32a). Configuring in this way makes it easy for the suction pad (20) to be thinned.

A configuration may be adopted whereby the lid section (54) includes a plurality of movable pieces (54a), and the drive section (56) moves the plurality of movable pieces (54a) in such a manner that the plurality of movable pieces (54a) are divided from each other, whereby the negative pressure breaking hole (44) opens.

A configuration may be adopted whereby the lid section (54) includes a plurality of movable pieces (54a), the drive section (56) moves the plurality of movable pieces (54a) to a certain position along the bottom wall section (32a), in such a manner that the plurality of movable pieces (54a) are divided from each other, whereby the negative pressure breaking hole (44) opens, and the plurality of movable pieces (54a) that have been moved to the certain position block at least a part of the negative pressure generating hole (42, 42a). Configuring in this way makes it easy for the air on the inside of the pad main body (32) to be passed to outside from the negative pressure breaking hole (44), even when the negative pressure breaking hole (44) is made smaller than the negative pressure generating hole (42, 42a). In addition, it makes it possible for the negative pressure to be more quickly broken when the negative pressure breaking hole (44) is larger than the negative pressure generating hole (42, 42a).

A configuration may be adopted whereby a plurality of the negative pressure generating holes (42) are included in a periphery of the negative pressure breaking hole (44), and a plurality of the negative pressure generating holes (42) are blocked by a plurality of the movable pieces (54a). Configuring in this way makes it possible for the air on the inside of the pad main body (32) to be passed to outside from the negative pressure breaking hole (44), even when the negative pressure breaking hole (44) is made smaller than the negative pressure generating hole (42, 42a). In addition, it makes it possible for the negative pressure to be more quickly broken when the negative pressure breaking hole (44) is larger than the negative pressure generating hole (42, 42a).

A method of suction release is a method of suction release of a suction pad (20) for releasing suction of a suction object (W). The suction pad (20) includes: a pad main body (32) which is hollow; an intake hole (40) provided in the pad main body (32), the intake hole (40) being for supplying a gas to an inside of the pad main body (32); a negative pressure generating hole (42, 42a) provided in a bottom wall section (32a) on a side facing the suction object (W) in the pad main body (32), the negative pressure generating hole (42, 42a) being for generating a negative pressure between the bottom wall section (32a) and the suction object (W) by jetting the gas flowing in from the intake hole (40); a negative pressure breaking hole (44) provided in the bottom wall section (32a), the negative pressure breaking hole (44) being for breaking the negative pressure; and a lid section (34, 54) that blocks the negative pressure breaking hole (44). The method of suction release includes when releasing suction of the suction object (W), moving the lid section (34, 54) in such a manner that the negative pressure breaking hole (44) opens.

In this method of suction release, when the negative pressure breaking hole (44) opens, air on the inside of the pad main body (32) flows to outside from the negative pressure breaking hole (44), whereby the negative pressure that had been generated between the bottom wall section (32a) of the pad main body (32) and the suction object (W) is broken. Therefore, suction of the suction object (W) can be released more quickly compared to when jetting of the gas from the negative pressure generating hole (42, 42a) is simply just stopped.

What is claimed is:

1. A suction pad comprising:
   a pad main body which is hollow;
   an intake hole provided in the pad main body, the intake hole being for supplying a gas to an inside of the pad main body;
   a negative pressure generating hole provided in a bottom wall section on a side facing a suction object in the pad main body, the negative pressure generating hole being for generating a negative pressure between the bottom wall section and the suction object by jetting the gas flowing in from the intake hole;
   a negative pressure breaking hole provided in the bottom wall section, the negative pressure breaking hole being for breaking the negative pressure;
   a lid section that blocks the negative pressure breaking hole; and
   a drive section that, when suction of the suction object is released, moves the lid section in such a manner that the negative pressure breaking hole opens, wherein the lid section and the drive section are disposed within the pad main body.

2. The suction pad according to claim 1, wherein
   a minimum cross-sectional area in the negative pressure breaking hole is larger than a cross-sectional area of the negative pressure generating hole.

3. The suction pad according to claim 1, wherein
   the drive section moves the lid section along a direction of separating from the bottom wall section.

4. The suction pad according to claim 1, wherein
   the drive section moves the lid section along the bottom wall section.

5. The suction pad according to claim 1, wherein
   the lid section includes a plurality of movable pieces, and
   the drive section moves the plurality of movable pieces in such a manner that the plurality of movable pieces are divided from each other, whereby the negative pressure breaking hole opens.

6. The suction pad according to claim 1, wherein
   the lid section includes a plurality of movable pieces,
   the drive section moves the plurality of movable pieces to a certain position along the bottom wall section, in such a manner that the plurality of movable pieces are divided from each other, whereby the negative pressure breaking hole opens, and
   the plurality of movable pieces that have been moved to the certain position block at least a part of the negative pressure generating hole.

7. The suction pad according to claim 6, wherein
   the negative pressure generating hole includes a plurality of negative pressure generating holes disposed in a periphery of the negative pressure breaking hole, and
   the plurality of negative pressure generating holes are blocked by a plurality of the movable pieces.

8. A method of suction release of a suction pad for releasing suction of a suction object,
   the suction pad including:
      a pad main body which is hollow;
      an intake hole provided in the pad main body, the intake hole being for supplying a gas to an inside of the pad main body;
      a negative pressure generating hole provided in a bottom wall section on a side facing the suction object in the pad main body, the negative pressure generating hole being for generating a negative pressure between the bottom wall section and the suction object by jetting the gas flowing in from the intake hole;
      a negative pressure breaking hole provided in the bottom wall section, the negative pressure breaking hole being for breaking the negative pressure; and
      a lid section that blocks the negative pressure breaking hole, wherein the lid section is disposed within the pad main body,
   the method comprising
      when suction of the suction object is released, moving the lid section in such a manner that the negative pressure breaking hole opens.

* * * * *